United States Patent
Hull, Jr. et al.

[11] 3,733,814
[45] May 22, 1973

[54] TRANSLATABLE ENGINE INLET PARTICLE SEPARATOR

[75] Inventors: Thomas Neil Hull, Jr., Marblehead, Anton Klug, Lawrence, both of Mass.

[73] Assignee: General Electric Company, Lynn, Mass.

[22] Filed: Feb. 22, 1972

[21] Appl. No.: 227,885

[52] U.S. Cl.............60/39.09 DP, 55/306, 55/422, 244/53 B, 45/121 G
[51] Int. Cl............................F02c 7/04, F01d 45/12
[58] Field of Search ........................60/39.09 P; 55/DIG. 14, 306, 314, 328, 422; 244/53 B; 415/158, 121 G

[56] References Cited

UNITED STATES PATENTS

| | | | |
|---|---|---|---|
| 3,534,548 | 10/1970 | Connors | 60/39.09 DP |
| 3,928,497 | 3/1960 | Stockdale | 60/39.09 DP |
| 2,997,257 | 8/1961 | Kerry | 244/53 B |
| 3,400,902 | 9/1968 | King | 244/53 B |
| 3,521,431 | 7/1970 | Connors et al. | 55/306 |
| 2,963,856 | 12/1960 | Caddell | 415/121 G |
| 2,623,610 | 12/1952 | Buechel | 55/306 |

Primary Examiner—Carlton R. Croyle
Assistant Examiner—Warren Olsen
Attorney—Edward S. Roman et al.

[57] ABSTRACT

An inlet particle separator is provided for use with a gas turbine engine wherein the separator may be axially translated out of the compressor inlet flowpath for improved engine efficiency in areas of relatively clean air where ingestion of extraneous matter within the engine appears unlikely.

8 Claims, 5 Drawing Figures

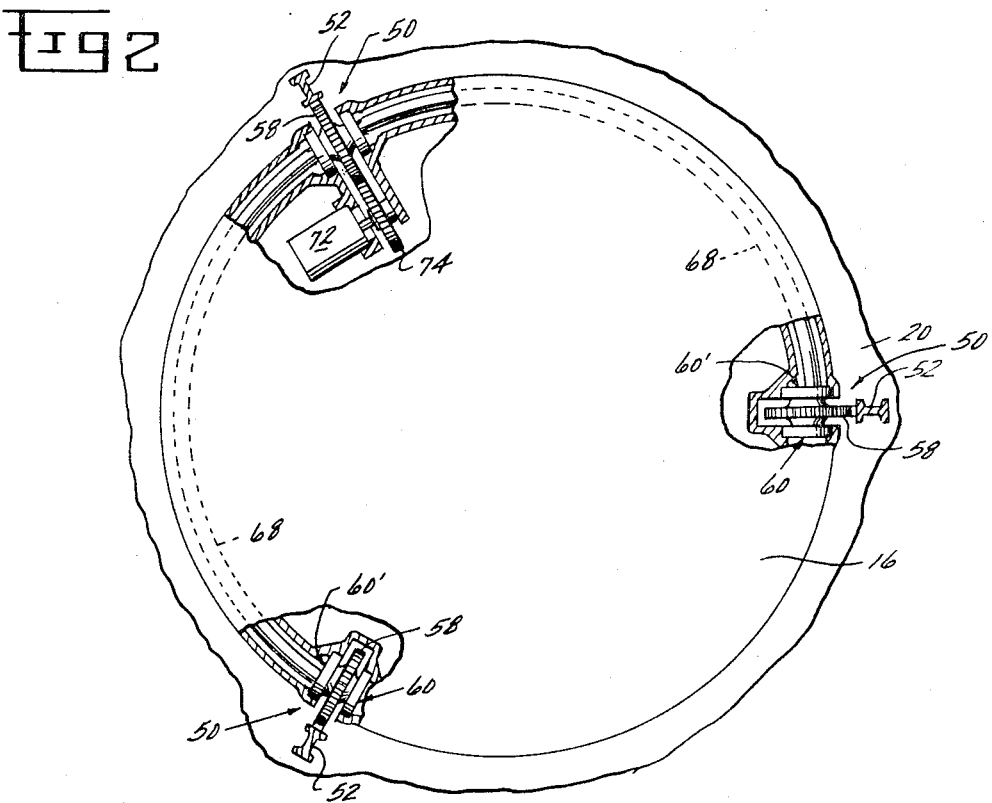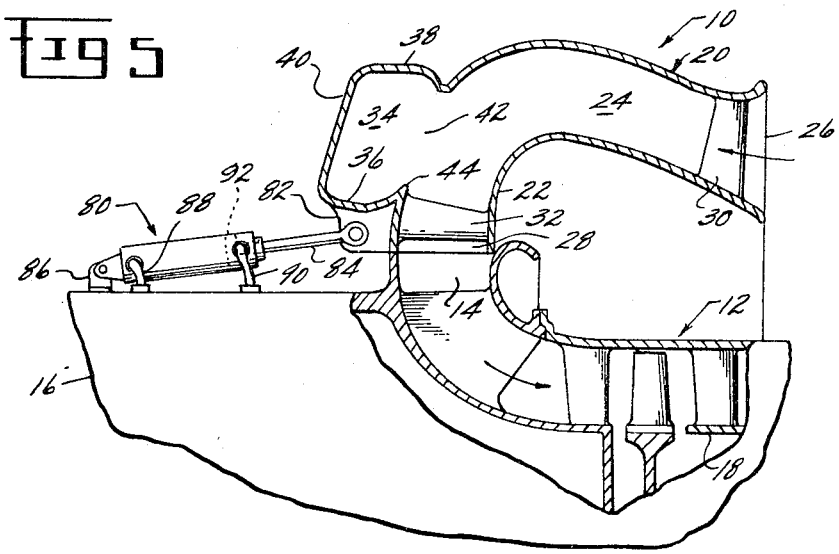

TRANSLATABLE ENGINE INLET PARTICLE SEPARATOR

The invention herein described was made in the course of or under a contract or subcontract thereunder (or grant) with the Department of the Air Force.

BACKGROUND OF THE INVENTION

This invention generally relates to a translatable engine inlet particle separator, and more particularly to an inlet particle separator for use with a gas turbine engine wherein the separator may be axially translated in and out of flow communication with the compressor inlet for improved engine fuel consumption and efficiency.

Aircraft gas turbine engines are particularly susceptible to damage from foreign objects introduced into the air inlets of the engines. This problem has been most acute in the past with respect to relatively large foreign objects such as stones, gravel, birds, hail and the like which, when introduced into the engine, can cause instant and massive damage. With the advent of gas turbine powered helicopters and other vertical takeoff and landing (VTOL) aircraft, smaller particles of foreign matter such as sand and water have become increasingly troublesome due primarily to the conditions under which such aircraft may be operated. Because of its VTOL capability, this type of aircraft may be utilized in areas where conventional airfields are nonexistent, such as in combat zones, and in other isolated areas. Helicopters and other VTOL aircraft are also especially suited for certain low altitude missions on both land and sea, including close combat support, search and rescue, and anti-submarine warfare. Under these and related conditions, substantial quantities of small foreign objects such as sand and dust particles and droplets of water may become entrained in the air stream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of the engine blading by high velocity particles. In addition to erosion, extraneous matter, particularly salt water introduced into the engine in this manner can cause rapid and destructive erosion.

It is, therefore, desirable to provide means for separating out the particles of sand, dust, water and the like before the air stream is supplied to the engine. To be satisfactory, it is essential that the separator chosen to provide this function be effective in removing the unwanted particles from the air stream. High efficiency is particularly desirable in an aircraft separator in view of the large quantities of air and, consequently, the large quantities of extraneous particles consumed by a gas turbine engine. Heretofore, separators have formed an integral part of the complete aircraft powerplant and have adversely affected the overall powerplant efficiency due to the pressure losses in the air stream flowing through the separator. Also, in order to avoid ice which may form on the separator means during aircraft operation, and block the fluid passageway, to cause an undesired reduction in the rate of air flow to the engine and accompanying loss of power, complicated anti-icing systems must be included within the separator.

Therefore, it is a primary object of this invention to provide a particle separator for use with a gas turbine engine wherein the separator does not cause an overall loss in powerplant efficiency during engine operation in areas of relatively clean air where the likelihood of extraneous particles entering the engine inlet is remote.

It is a further object of this invention to provide a particle separator for use with a gas turbine engine wherein the separator is readily translatable out of the engine inlet air stream during engine operation in areas of relatively clean air where the likehood of extraneous particles entering the engine inlet is remote.

It is also an object of this invention to provide a particle separator for use with a gas turbine engine wherein an anti-icing system need not be included within the separator.

SUMMARY OF THE INVENTION

A gas turbine engine assembly including a compressor, a combustor, and a turbine in serial flow arrangement further includes a translatable engine inlet particle separator for removing extraneous matter from the stream of air supplied to the compressor. The particle separator includes a pair of spaced apart walls which define an annular passageway therebetween having at opposite ends thereof an annular inlet and an annular outlet for flow communication with the compressor. Additional wall means define an extraction cavity in flow communication with the annular passageway for receiving and removing extraneous matter from the stream of air supplied to the compressor through the passageway. Means for centrifuging the extraneous matter out of the air stream within the passageway into the extraction cavity are also provided. Means for axially translating the separator in and out of flow communication with the compressor inlet provide improved engine performance in areas of relatively clean air where the likelihood of extraneous particles entering the engine is remote.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 2 is a partial cross-sectional view with portions deleted taken along the line 2—2 of FIG. 1.

FIG. 5 is a partial cross-sectional view of an alternate arrangement for the particle separator of this invention as included on the compressor inlet of a gas turbine engine.

DESCRIPTION OF THE PREFERRED EMBODIMENT

Figures 1, 3, 4:
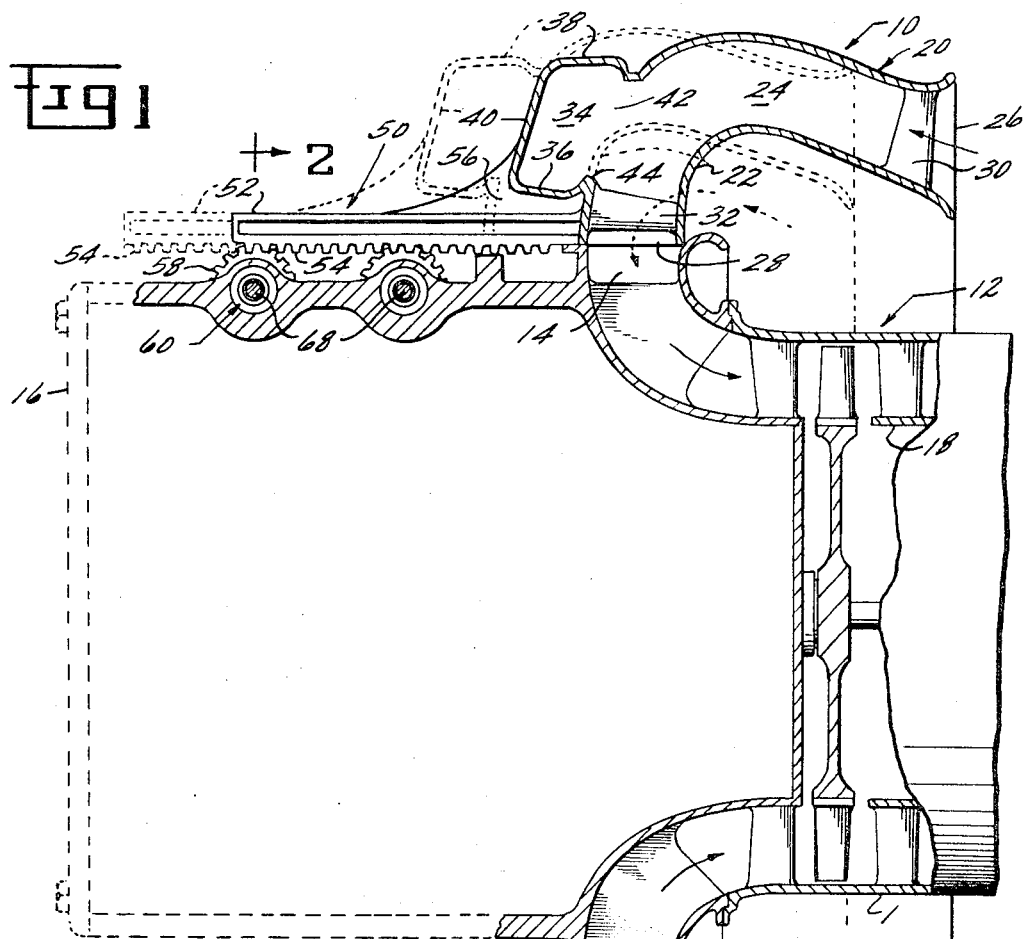
FIG. 1 is a partial cross-sectional view of the particle separator of this invention with portions deleted as included on the compressor inlet of a gas turbine engine.
FIG. 3 is an enlarged partial cross-sectional view of one gear of the particle separator of FIG. 1.
FIG. 4 is an enlarged partial cross-sectional view of another gear of the particle separator of FIG. 1.

Referring now to FIG. 1, there is shown generally at 10 the translatable inlet particle separator assembly of this invention. The separator assembly of this invention is shown mounted on the front of a gas turbine engine 12 in flow communication with a radial inflow bellmouth air inlet 14. The gas turbine engine 12 includes a forwardly extending accessory gearbox 16 shown outlined partly in phantom lines. The gas turbine engine 12 also includes an axial flow compressor 18, a combustor (not shown), a turbine (not shown), and an exhaust nozzle (not shown), all of which are disposed in serial flow communication with the air inlet 14 to form a conventional gas turbine engine. The gas turbine engine 12 may be of the turboshaft type where it would be particularly suited for helicopter applications. However, it will become obvious to those skilled in the art that the separator may be used in conjunction with turbojet and turboprop engines as well as turboshaft engines since the separator is essentially suited for all forms of turbine engines.

As illustrated in FIG. 1, the separator assembly 10 has an outer curved casing or wall indicated generally by the numeral 20 and an inner curved casing or wall indicated generally by the numeral 22 defining therebetween an axially and radially extending curved annular passageway 24. The annular passageway 24 includes at opposite ends thereof an axial inflow bellmouth inlet 26 and a radial outflow bellmouth outlet 28 communicating with the radial flow bellmouth inlet 14 of the gas turbine engine. A row of circumferentially spaced radially extending swirl vanes 30 are located adjacent the inlet 26 and another row of circumferentially spaced axially extending deswirl vanes 32 are located adjacent the outlet 28.

An annular extraction cavity 34 is defined by inner and outer curved walls 36 and 38 respectively, together with a radially extending curved wall 40 peripherally joined to the inner and outer walls 36 and 38. The extraction cavity 34 is in flow communication with the passageway 24 through an annular opening 42 in the outer wall 20 of the separator assembly 10. To prevent particles of extraneous matter which may enter the cavity 34 in a manner to be described below from rebounding back into the passageway 24, there is provided a radially extending circumferential lip 44 around the inner edge of the annular opening 42. The lip 44 may be partially rolled over to form a gutter (not shown).

Referring now to FIG. 2 in conjunction with FIG. 1, there is shown generally at 50 a rack and pinion assembly for axially translating the particle separator out of the engine inlet flowpath during normal engine operation. The rack portion of the assembly 50 includes at least three axially extending I beams 52 which are equally spaced apart at 120° intervals around the periphery of the accessory gearbox 16. Each I beam is attached at the aft end to the outer wall of the separator and includes a plurality of spaced apart gear teeth 54 inwardly projecting from the interior surface thereof. The I beams may be axially strengthened by means of stiffening webs 56 which connect the outside surfaces of the I beams with the outside wall 20 of the separator.

The pinion portion of the rack and pinion assembly 50 includes a plurality of gears 58 which are journalled for rotation adjacent the inner periphery of the accessory gearbox. The teeth of the gears 58 engage and interlock with the teeth 54 of I beam 52 such that rotation of the gears 58 imparts an axial translation to the I beams.

Referring now to FIGS. 3 and 4 it can be seen that each gear 58 is journalled for rotation with respect to the accessory gearbox 16 by means of two bearing assemblies 60, 60' shown spaced apart on opposing sides of gear 58. Each bearing assembly 60, 60' includes an inner bearing race 62 which may be press fitted to the gear 58 for rotation therewith, an outer bearing race 64 which remains stationary with respect to the accessory gearbox 16, and a plurality of rollers 63 which are circumferentially disposed between the inner and outer bearing races. Although the preferred embodiment has been described as including three circumferentially spaced apart rack and pinion assemblies, it becomes immediately obvious to those of ordinary skill in the art that more than three rack and pinion assemblies circumferentially spaced about the accessory gearbox would be equally satisfactory, and that even one or two rack and pinion assemblies could be utilized for axially translating the separator provided adequate guide means are included for maintaining the axial integrity of the separator during translation.

Synchronization between the circumferentially spaced gears 58 is provided by means of a flexible synchronizing cable 68. Although the cable 68 may be readily flexed along its central axis, it is of sufficient cross-sectional stiffness to transmit the turning moment of the gear at one end thereof to the gear at the other end without significant cross-sectional twisting or deformation. The cable 68 is keyed to engage hexagonal apertures 70 through the geometric centers of the gears 58, thereby insuring rotation of the cable and gears together without circumferential slippage therebetween. Rotation of the gears 58 is accomplished through a hydraulic drive motor 72 shown in FIGS. 2 and 3 stationed within the accessory gearbox and rotatably connected to one of the gears 58 by means of a drive gear 74. The motor may be actuated by the pilot through a valve, switch or the like.

During operation of the gas turbine engine 12, in areas where particles of extraneous matter are likely to enter the engine, air is drawn through the annular passageway 24 of the separator at high velocity by the low pressure area existing at the inlet to the compressor 18. As the air passes between the radial swirl vanes 30 it is turned circumferentially such that downstream of the vanes 30 the air stream has both angular and axial velocity. In this manner swirl is imparted to the fluid stream. Small particles of foreign matter entrained in the air stream are also turned, this turning resulting primarily from the particles, which have small mass, being carried along with the swirling air. To assure that particles having large mass are also turned by the swirl vanes, it may be desirable to overlap adjacent vanes circumferentially so that a particle cannot pass axially between adjacent vanes without striking a vane and thereby being turned. A particle entrained in the air stream and turned will have both tangential and axial velocity downstream of the swirl vanes 30. In theory, a particle leaving the vanes 30 with both tangential and axial velocity and not being subject to any external forces will follow a straight line path to the outer periphery of passageway 24 at some point downstream of the vanes 30. In practice, however, the swirling air has a significant effect on the particle's trajectory; its actual trajectory can be compared roughly to that of a helix having increasing diameter in the downstream direction.

In the preferred practice of the present invention, the swirl vanes 30 have a turning configuration which will cause the entrained extraneous matter to reach the outer periphery of the passageway 24, and either flow directly into the annular extraction cavity 34 through the annular opening 42 or strike the inner wall 22 and rebound therefrom into the cavity 34. Once the particles enter the cavity 34, the radially extending lip 44 prevents their return to the passageway 24. The particles are thus collected in the cavity 34 where they may remain until the engine 11 is shut down or where they may be removed during engine operation by an exhaust blower (not shown) mounted directly to the separator. At this point, it will be obvious to those skilled in the art that the size of cavity 34 and opening 42 should be sufficient to contain and admit all particles which may be encountered during operation under extremely adverse conditions. The turning configuration of the deswirl vanes 32 is as required to remove the swirl produced by the swirl vanes 30 under most operating conditions.

Although the translatable engine inlet particle separator of this invention has been described as including swirl and deswirl vanes, it would be possible to entirely eliminate the swirl and deswirl vanes due to the turn in the passageway 24. Air drawn around the turn in the passageway 24 is centrifuged such that extraneous matter within the air flow is cast toward the outer wall 20 and into the annular extraction cavity 34. Swirl and deswirl vanes would generally be preferred, however, due to the increased separation efficiency which they provide.

The Phantom lines in FIG. 1 show the inlet particle separator of this invention translated forward of the compressor inlet for flight operation in atmospheres where the danger of extraneous matter entering the inlet becomes relatively remote. The particle separator may be translated axially forward by the pilot actuating the motor 72 which drives the gears 58 in counterclockwise directions through drive gear 74. All the circumferentially spaced gears 58 are synchronously driven by means of cable 68 such that uniform counterclockwise rotation of the gears effects a forward axial translation of the I beams and separator. Translating the separator forward out of the compressor inlet flowpath improves engine performance and efficiency, and further eliminates the need for providing a means for preventing ice formation within the separator. Upon approaching a dusty landing zone where the danger of extraneous matter entering the engine inlet becomes significant, the pilot can actuate the motor 72 in the reverse direction so as to translate the separator axially aft back into alignment with the compressor inlet flowpath. It will be readily appreciated by those skilled in the art that air or electric motors could also be satisfactorily utilized in place of the hydraulic motor. Also, it should be recognized as well within the scope of invention to attach the rack and pinion assembly 50 to the aft side of the separator in order to translate the separator aft of the compressor inlet.

Referring now to FIG. 5 where like numerals refer to previously described elements, there is shown an alternate embodiment wherein circumferentially spaced fluid operated actuators shown generally at 80 are substituted for the rack and pinion assemblies in order to effect axial translation of the separator. Brackets 82 are secured to the separator, and actuation rods 84 of the fluid operated actuators 80 are pinned with a clevis arrangement to the brackets 82. Brackets 86 are secured to the accessory gearbox 16 and the actuators 80 are pinned with a second clevis arrangement to the brackets 86 so that motion of the rods 84 will be transmitted to the separator, causing an axial translation thereof. Actuators 80 can be remotely controlled by the pilot and include end stops designed to give positive positioning of the actuation system at two end points. Actuator fluid is supplied through two conduits 88, 90 such that an imbalance in fluid pressure acts to cause translation of a slidable balance piston 92. Conduits 88, 90 are in flow connection with a source of actuator fluid which is not shown. The actuator fluid may be either of the hydraulic or gaseous type.

Having thus described preferred embodiments of the invention, though not exhaustive of all possible equivalents, what is desired to be secured by letters patent is that which appears in the claims below.

What is claimed is:

1. In a gas turbine engine assembly including a compressor, a combustor, and a turbine in serial flow arrangement, a translatable engine inlet particle separator for removing extraneous matter from the stream of air supplied to the compressor comprises:

a pair of spaced apart walls defining an annular passageway therebetween having at opposite ends thereof, an annular inlet and an annular outlet for communication with the compressor;

wall means defining an air extraction cavity in flow communication with the annular passageway for receiving and removing extraneous matter from the stream of air supplied to the compressor through the passageway;

means for centrifuging the extraneous matter out of the air stream within the passageway into the extraction cavity;

and means for axially translating the separator in and out of flow communication with the compressor inlet to provide improved engine performance in areas of relatively clean air where the likelihood of extraneous particles entering the engine is remote.

2. The translatable engine inlet particle separator of claim 1 wherein the translating means includes at least one rack and pinion assembly with one end of the rack connected to the separator and extending therefrom in a generally axial direction, and wherein the teeth of the rack engage the teeth of the pinion gear which is rotatably disposed with respect to the engine such that rotation of the pinion gear effects an axial translation of the rack and separator.

3. The translatable engine inlet particle separator of claim 2 wherein the walls curve from an annular inlet of the axial inflow bellmouth type to an annular outlet of the radial outflow bell-mouth type for direct flow communication with a compressor inlet of the radial inflow bellmouth type and wherein the extraction cavity is an annular chamber in flow communication with the outside wall of the separator by means of an annular opening therethrough.

4. The translatable engine inlet particle separator of claim 2 wherein the centrifugal means includes a row of circumferentially spaced swirl vanes adjacent the inlet and a row of circumferentially spaced deswirl vanes adjacent the outlet.

5. The translatable engine inlet particle separator of claim 2 wherein the gas turbine engine includes an accessory gearbox extending forward of the compressor inlet having at least three equally spaced apart rack and pinion assemblies, circumferentially disposed about the gearbox with each pinion gear rotatably disposed with respect to the gearbox.

6. The translatable engine inlet particle separator of claim 1 wherein the translating means includes at least one fluid operated actuator one end of which is connected to the engine with the other end connected to the separator such that operation of the actuator effects a generally axial expansion or contraction of the actuator further effecting an axial translation of the separator.

7. The translatable engine inlet particle separator of claim 6 wherein the walls curve from an annular inlet of the axial inflow bellmouth type to an annular outlet of the radial outflow bellmouth type for direct flow communication with a compressor inlet of the radial inflow bellmouth type and wherein the extraction cavity is an annular chamber in flow communication with the outside wall of the separator by means of an annular opening therethrough.

8. The translatable engine inlet particle separator of claim 6 wherein the centrifugal means includes a row of circumferentially spaced swirl vanes adjacent the inlet and a row of circumferentially spaced deswirl vanes adjacent the outlet.

* * * * *